United States Patent [19]

Holloway

[11] Patent Number: 5,190,226

[45] Date of Patent: Mar. 2, 1993

[54] APPARATUS AND METHOD FOR SEPARATION, RECOVERY, AND RECYCLING MUNICIPAL SOLID WASTE AND THE LIKE

[76] Inventor: Clifford C. Holloway, 39368 Camp Dr., Praireville, La. 70769

[21] Appl. No.: 692,550

[22] Filed: Apr. 29, 1991

[51] Int. Cl.⁵ ............................................. B02C 23/24
[52] U.S. Cl. ..................................... 241/23; 209/930; 241/24; 241/65; 241/79; 241/DIG. 38
[58] Field of Search ............................. 241/18, 23–24, 241/57, 65, 79, 299, DIG. 38; 209/3, 11, 930

[56] References Cited

U.S. PATENT DOCUMENTS 4,844,351  7/1989  Holloway .................... 241/DIG. 38

Primary Examiner—Douglas D. Watts
Attorney, Agent, or Firm—John C. Garvin, Jr.; Harold W. Hilton

[57] ABSTRACT

Apparatus and method for separation, recovery, and recycling municipal solid waste and the like by introducing solid waste materials into a rotatable pressure vessel, rotating, pressurizing, and heating the pressure vessel and thus the waste material while simultaneously applying an extruding action to the solid waste material. The extruding action is achieved by a rotatable extruder mechanism carried in the pressure vessel which forces the processed solid waste material through a constricted area adjacent the exit of the pressure vessel.

21 Claims, 4 Drawing Sheets

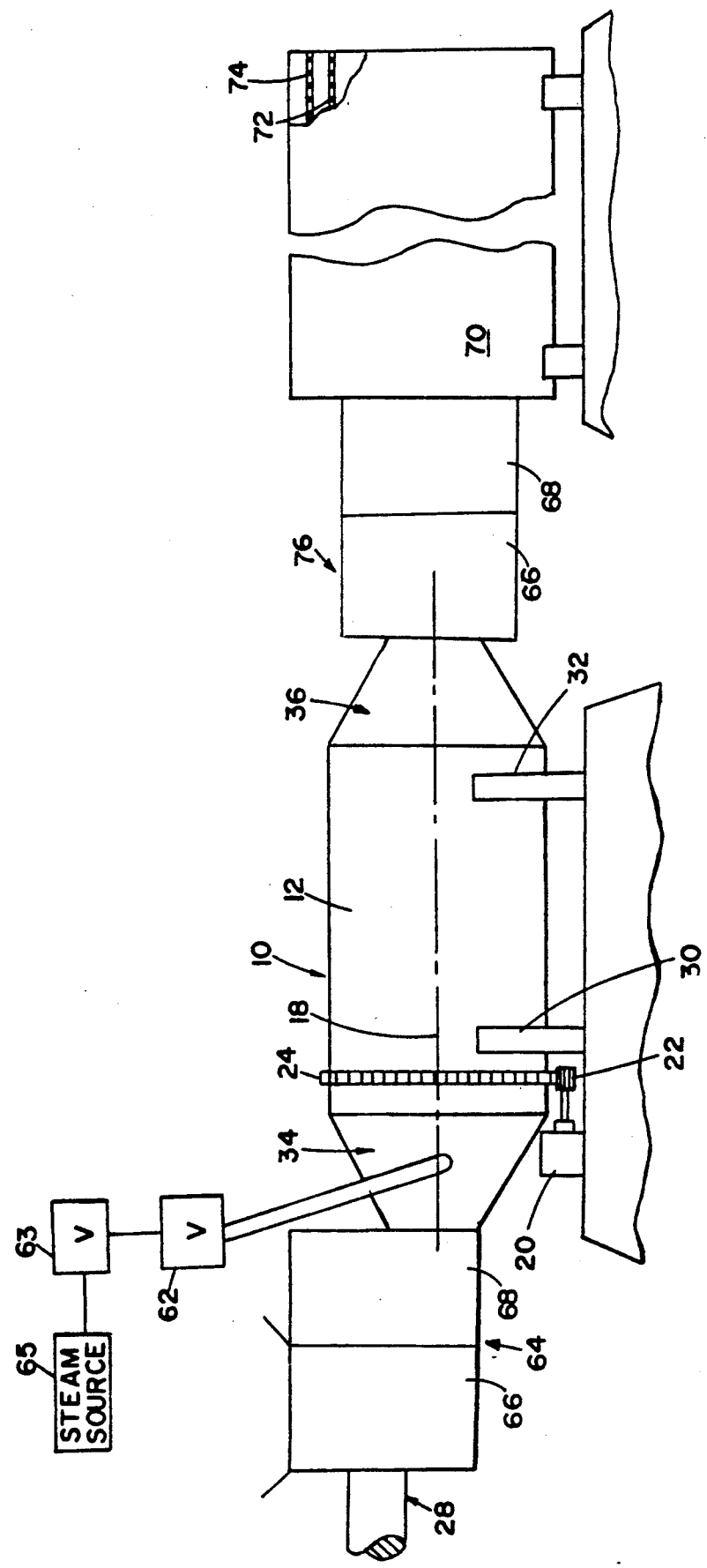

APPARATUS AND METHOD FOR SEPARATION, RECOVERY, AND RECYCLING MUNICIPAL SOLID WASTE AND THE LIKE

FIELD OF THE INVENTION

This invention relates to a method and apparatus for recovering valuable materials from waste including municipal solid waste (MSW).

BACKGROUND OF THE INVENTION

One solution to solid waste disposal has been to place the solid waste (including MSW) into landfills. Other solutions to the disposal problem included mass incineration, preparation and combustion of refuse derived fuel (RDF), and size reduction for composting. Each of these methods have undesirable consequences. For example, most of the waste (excluding plastics, metals and glass) becomes lost and are, therefore, not recyclable. Plastics, metals and glass, while not lost, become nearly permanent components of the disposal site due to the chemical resistance and non-biodegradable nature of these polymers. In the combustion of plastics, hydrocarbons, dioxins, furans, acid gases and NOx, emissions in the stack gases of mass burn or RDF incineration facilities can be major sources of air pollution with rather severe health and environmental consequences unless severe, expensive pollution control measures are in place.

In my prior U.S. Pat. No. 4,342,830, dated Aug. 3, 1982, steam treatment of MSW is disclosed wherein the sterilized and softened organics are forced through perforations upon sudden release of pressure whereby inorganics and certain synthetics, such as metal cans, glass, and the like are left behind. This method included the addition of significant quantities of water to the wastes and thus required substantial energy consumption in the form of steam to heat the water/waste slurry and to force the resultant sterile and softened organics through the perforations in a singular step. The plastics recovered which were suitable for recycling were generally less than 2% of the waste by weight and were generally severely contaminated with softened organics and dirt. The inorganic materials such as ferrous and non-ferrous metals were also similarly contaminated making these products less desirable for recycling. The glass components were both broken and contaminated.

In my prior U.S. Pat. No. 4,540,495, dated 10, 1985, steam treatment was again disclosed wherein the amount of water added prior to steam treatment was significantly reduced to conserve the energy consumed and to reduce the moisture content of the softened organic fraction to in the order of 60% by weight. The internal steam pressure requirements in combination with the resultant temperatures and the necessary period of time it took to cook and sterilize the waste material and soften the organic matter also caused a melting of many plastics and significant heat distortion of most other plastics as in the previous U.S. Pat. No. 4,342,830.

Also, in my prior U.S. Pat. No. 4,844,351 a method for separation, recovery and recycling of plastics from municipal solid waste was disclosed wherein mixed wastes including various plastic elements were subjected to mechanical agitation and heat distortion. The wastes were introduced into a processing unit having a means for heating and a means for agitating the wastes. By this method, the plastics were separated and recovered as a mixture that may be recycled. The processing unit included an inclined, cylindrical rotatable vessel having closure members (hatches) at opposite ends thereof. A plurality of spaced plates, inclined in a common plane and secured to the internal wall of the cylinder extends into the interior of the cylinder. The plates were arranged to only provide a lifting and mixing action to the waste material; however, because of the arrangement of the plastic, only a small degree of mixing of the materials could be accomplished.

The above noted defects of the prior art is overcome by the method and structure of the present invention which provides for "extruding" the waste materials in a pressurized heated container. Such extrusion process provides for substantially "fluidizing" the organic material thus making it more easily separated from the inorganic materials such as glass, metals, etc.

SUMMARY OF THE INVENTION

It is an object of the present invention, therefore to provide a method and apparatus for the efficient separation and recovery of recyclable materials.

It is another object of the present invention to provide such method and apparatus which facilitates the separation and recovery of the recyclable materials in a rapid, facile, and inexpensive manner.

In accordance with the objects, the present invention contemplates the provision of an extruder mechanism which extrudes the waste materials while the waste materials are subjected to heat and pressurization. In one embodiment, the separation and recovery of waste materials is accomplished in batches, in a discontinuous process. In this embodiment, an indirect extrusion process is carried out in a rotating chamber. The waste materials are introduced into a chamber which is closed, pressurized and heated, the waste materials are then extruded while in the chamber by the extruder mechanism and the exit closure member is vented and then opened to allow the processed waste materials to be forced out by action of the extruder or otherwise removed from the chamber.

In another embodiment of my invention, an extruder mechanism provides a substantially continuous extruding action on the waste materials which are substantially continuously fed in a heated and pressurized processor chamber of a rotating pressure vessel. The pressure vessel chamber has its exit end in direct communication with a rotating trommel having a waste receiving chamber provided with a lower pressure than the processor chamber pressure. In this embodiment direct extrusion occurs as a result of the extruder mechanism continuously forcing the waste materials through the higher pressure processor chamber into the lower pressure chamber of the rotating trommel. The processed material is then carried away from the trommel for further classification.

BRIEF DESCRIPTION OF THE DRAWINGS

FIG. 3 is a longitudinal sectional view of the pressure vessel of FIGS. 1 and 2.

DESCRIPTION OF THE PREFERRED EMBODIMENT

Figure 1:
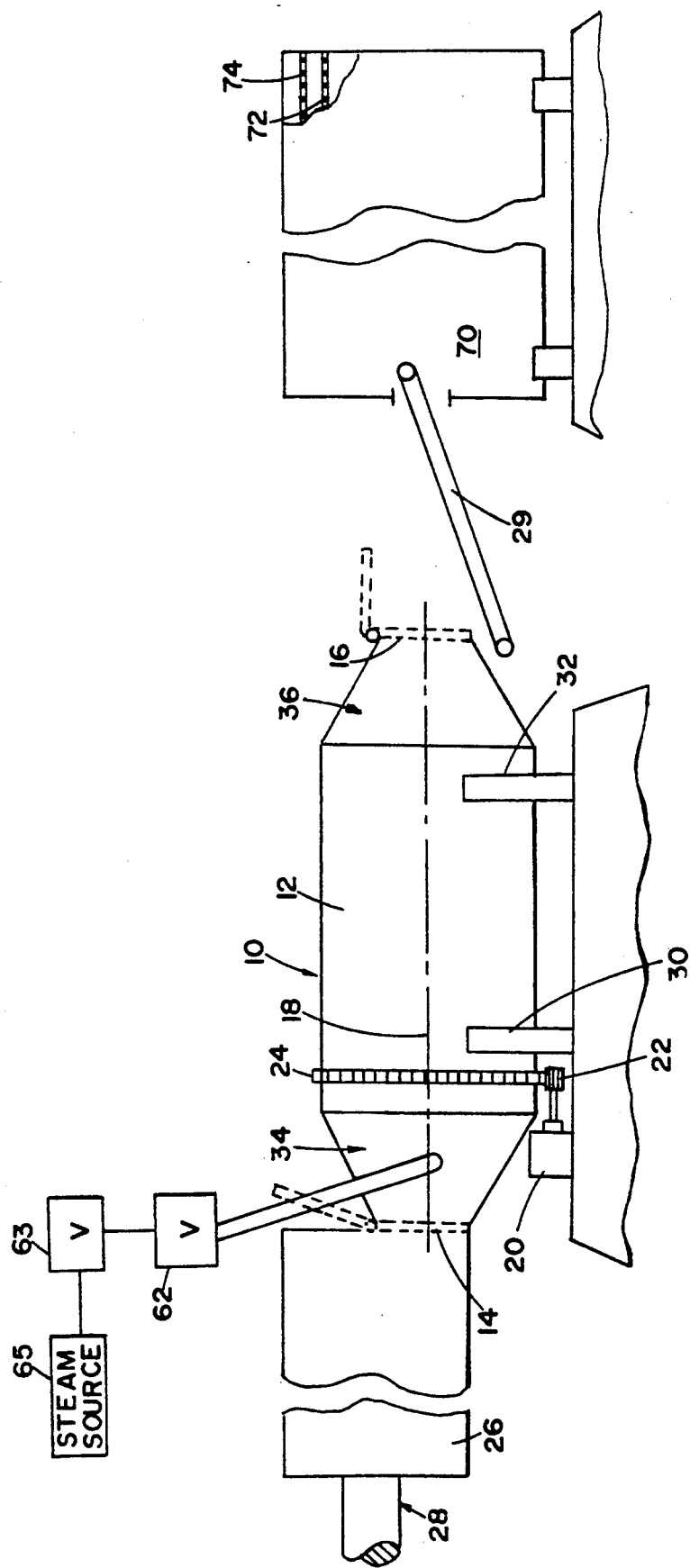
FIG. 1 is an elevational view of a pressure vessel and feed mechanism therefor according to one embodiment of my invention.

As seen in FIG. 1, a process unit 10 is shown to include a cylindrical vessel 12 having a pair of end closure members 14 and 16. The process unit 10 is mounted for rotation about a longitudinal axis 18. Rotation is accomplished (for example) by a motor 20 having an output gear 22 in meshed relation with a gear 24 secured around the periphery of vessel 12. The waste is shown, for illustrative purposes, in FIG. 1, being introduced into the process unit through closure member 14 from a hopper 26. A hydraulic ram 28 pushes the waste from the hopper into vessel 12. A conveyor system 29 may be used (for example to carry away the waste material to a rotating trommel 31 for classification of the waste materials as described hereinbelow.

The cylinder may be rotatably mounted in a pair of support members 30 and 32 having ball bearings or the like (not shown) to facilitate the rotation. Also, if desired, the pressure vessel may be inclined at a predetermined angle.

Figure 2:
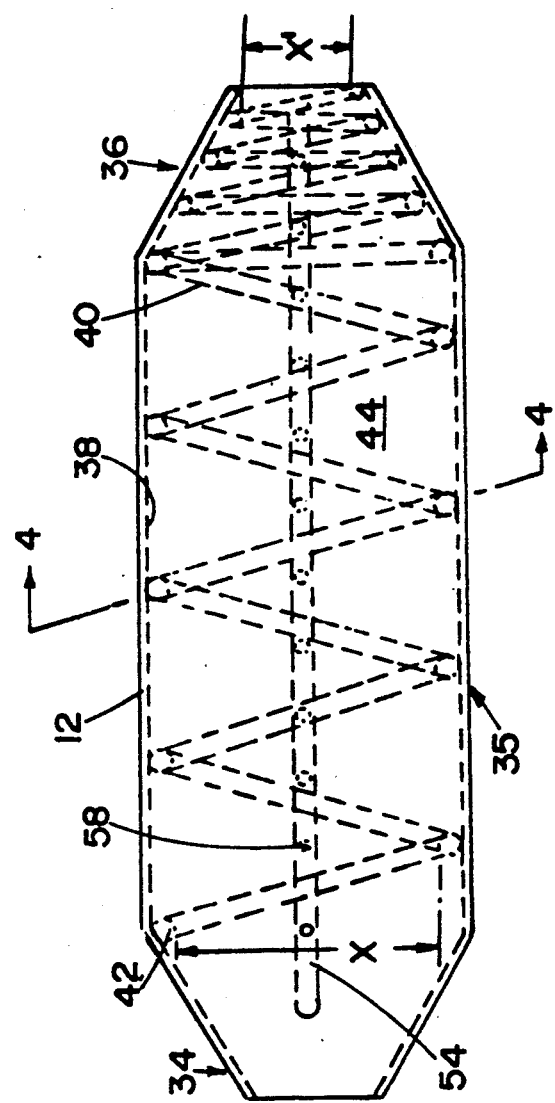
FIG. 2 is an elevational view of the pressure vessel and feed mechanism therefor according to another embodiment of my invention.
Figure 4:
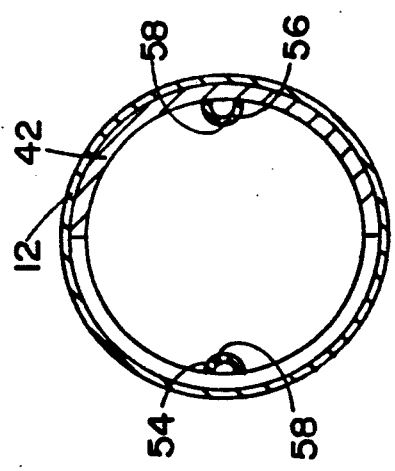
FIG. 4 is a sectional view taken along line 4—4 of FIG. 3.

As seen in FIG. 2, the inner surface 38 of cylindrical vessel 12 is provided with an extruder member 40 (flighting) in the form of spaced blades 42 extending from the internal surface 38 of vessel 12 into chamber 44 thereof. The blades may be comprised of a single continuous screw member or a sectional arrangement of blades which extends in a helical configuration substantially along the length of the pressure vessel with the blades being spaced closer together at the exit end portion 36 of vessel 12. The internal spacing between the tip ends of blades 42 at the forward end 34 and the intermediate portion 35 of vessel 12 is designated by the letter "X". The internal spacing between the ends of blades 42 at the exit end portion 36 of vessel 12 is designated "X'".

A pair of steam lines 54 and 56 are mounted longitudinally along the opposite inner surfaces of vessel 12 and each line is provided with spaced openings 58 through which steam is directed into the interior of vessel 12. The lines form sparges for distributing the steam throughout the vessel and includes external portions 58 and 60 which are secured to a rotary coupling or valve (indicated at 62) which secures the interior steam lines 54 and 56 to an external source of steam pressure 65 through a valve 63. Such rotary valves or couplings are well known in the art. If desired, the steam passages (sparges) may be incorporated in the flighting to improve heat transfer within the chamber.

In the operation of the embodiment shown in FIG. 1, the solid waste material is introduced into the cylindrical vessel 12 from the hopper 26 by a hydraulic or pneumatic ram mechanism 28 (for example). Other conventional techniques such as air locks, gravity feed, etc., may be used, if desired.

Once the waste material is introduced into the cylindrical vessel (with exit closure member 16 closed) the inlet closure member 14 is closed, a steam valve 64 is opened and steam is directed into the interior of the vessel through lines 54 and 56. Pressure vessel 12 is pressurized and rotated and the tapered helical configuration of the flighting extrudes the waste materials to the closed end of the vessel. Since exit closure member 16 is closed and there is no exit, the waste material is squeezed back (extruded) through the space "X" between the ends of the blades 42. This process causes any paper (cellulose) which is unaffected by moisture and heat to be torn apart by the compression and sheer action of the indirect extrusion.

After a predetermined time period of the waste materials being subjected to pressurization and heat in vessel 12, the vessel is vented by a valve (not shown), closure member 16 is opened and the heated and pressurized material is forced out of vessel 12 by rotary action of the blades.

In the embodiment illustrated in FIG. 3, wherein like reference numerals refer to like parts, pressure vessel 12 is shown rotatably mounted in supports 30 and 32 for rotation by motor 20 as described above. In this embodiment, the rotation, heating and pressurization of vessel 12 is continuous and the waste materials are introduced by hydraulic or pneumatic ram 28 into vessel 12 through an "air lock" type system 64. Such "air lock" systems are well known in the art and typically include a pair of separate pressurizable chambers 66 and 68.

Exit end 36 of vessel 12 remains open throughout the continuous process and exit end 36 remains in direct communication through an "air lock" type assembly 75 with a rotating trommel 70 which may be rotated in a manner similar to vessel 12. Trommel 70 includes a pair of spaced screens 72 and 74 for separating the processed material according to size. The "air-lock" assembly 75 includes a pair of pressurizable chambers 66 and 68 as is well known in the art.

In operation, as steam is being introduced into the rotating pressure vessel 12, waste materials are being introduced into vessel 12 through the entrance opening by the action of ram 28 pushing the waste materials through the airlock system and into the pressure vessel. Because of the configuration of the flighting, the waste materials are continuously extruded through the constricted space "X'" and into the rotating trommel. The rotating trommel has a larger volume than vessel 12 and the pressure in the trommel is less than the pressure in vessel 12, thus creating a flow from the higher pressure to lower pressure. Pressure on the waste materials which continuously leave the vessel 12 because of the continuous extrusion, is decreased in the trommel which allows the materials to expand. The plastics and paper containers in the waste materials lose their tensile strength as a result of exposure to the heat and pressure in vessel 12 and expand in the trommel causing the plastic and paper containers to rupture and spill their contents into the trommel.

The waste materials are separated in the trommel by means of screens which include a first layer of screen material 72 having larger openings than a second screen 74 which is mounted in spaced relation with the first screen layer. Separation is efficiently accomplished in the trommel since the organic waste material is more fluid while heated and pressurized.

The various sized components exit the trommel and may be further classified by magnetic means, eddy currents, dynamic screens, raggers, etc., as disclosed in my U.S. Pat. No. 4,844,351.

Valuable recyclables are efficiently recovered by the process and apparatus of the present invention. The resulting organic material is 50% to 65% cellulose and has value as a fuel for combustion. It may be readily bio-chemically converted to gas and liquid fuels such as methane or ethanol, used in the manufacture of low grade fabrics or composted.

Apparatus and method of the present invention finds application in landfill mining which is the process of excavating a landfill and uses conventional surface mining technology which includes placing the landfill material on vibratory screens. The upper screen has larger openings than the lower screen which allows the smaller material to fall through the screen with larger openings to the screen having smaller openings. Most materials falling through the larger opening screen and retained by the smaller opening screen is recyclables such as metals, glass, plastics and some organic material. Material retained on the larger opening screen typically includes fabric, building material with wood, etc., and MSW contained in plastic bags. The recoverable material may be processed by application of the principles of the present invention.

It is to be understood that a vibrating screen assembly similar to that described above in conjunction with the landfill mining procedure may be used to separate the waste components directed out of pressure vessel 12 in lieu of the rotating trommel 72, if desired.

Figure 5:
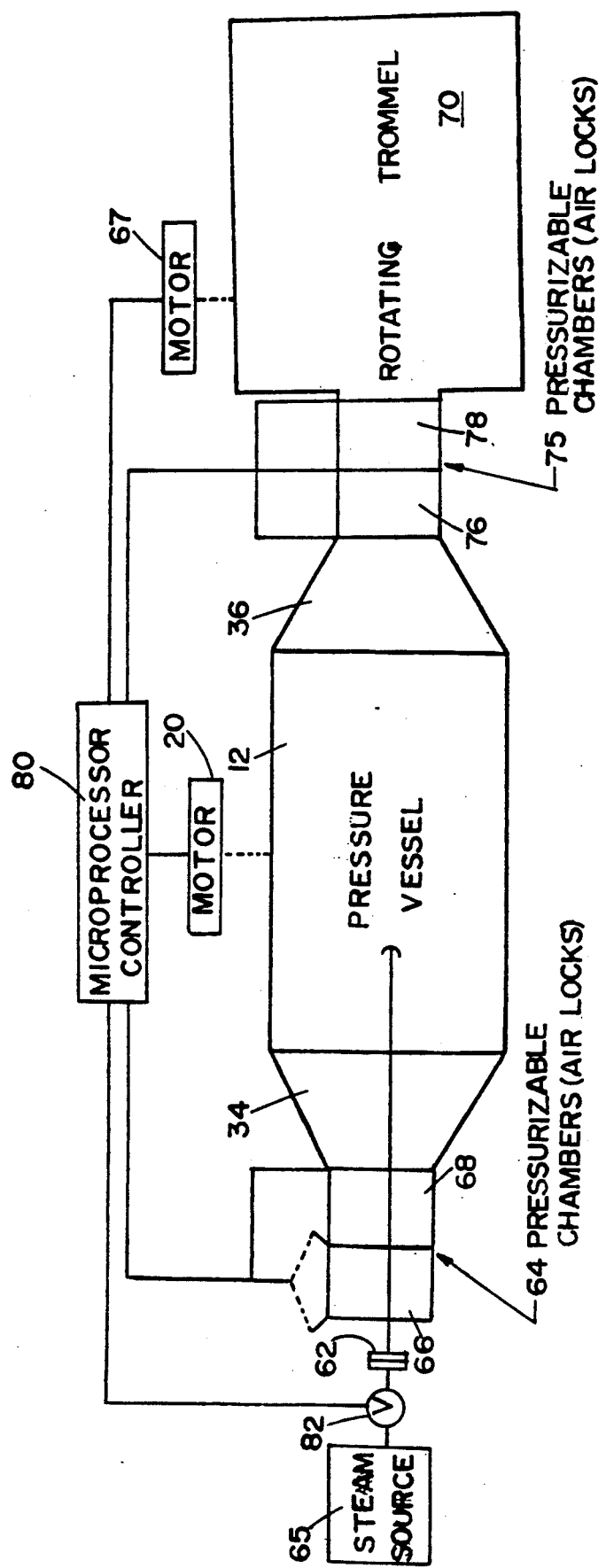
FIG. 5 is a block diagram of a microprocessor control system for the automatic operation of the apparatus used in the present invention.

If desired, the system may be microprocessor controlled as seen in FIG. 5. A microprocessor 80 is shown connected to an actuator 82 for actuation of steam valve 65. Pressurizable chambers 66 and 68 of "air lock" type structure 64 may be opened or closed by control valves which control pneumatic or hydraulic actuators (not shown). The control valves of the actuators are operated by signals from microprocessor 80 in a manner well known in the art. Motors 20 and 67 are also actuated by microprocessor 80 to impart rotation to pressure vessel 12 and to trommel 70 at the desired time. Pressurizable chambers 76 and 78 of the "air-lock" type arrangement 75 are also open or closed by control valves which control pneumatic or hydraulic actuators (not shown) which operate closure members associated with pressurizable "air-lock" chambers. The closure members referred to herein may be doors, slidable plates, iris diaphragms or the like. In the embodiment of FIG. 3, the source of pressure is shown to be the steam source for the pressure vessels; however, other sources of pressure may be resorted to, if desired. Also, while the microprocessor is shown to be included in the embodiment of FIG. 3, such microprocessor control system is also applicable to the embodiment of FIG. 1.

In one example of the present invention, the pressure vessel used was 40 feet long, 8 feet in diameter and included conical ends with doors that were approximately 3 feet in diameter. The vessel was designed for 100 psig line stream and was equipped with two internal sparging lines, 4 inches in diameter with ⅛ inch openings spaced 8 inches apart.

The vessel was rotated at approximately 8 RPM while line steam was introduced into it. Internal pressure was brought to approximately 45 psig in approximately 45 minutes. After depressurizing for approximately another 45 minutes, the vessel was emptied and the contents observed.

The resulting cellulose material had the appearance of being finely shredded instead of pulped. It had a moisture content of in the order of 40% and was easily separated from organics such as glass and metals. Plastic such as HPDE (milk cartons with a low melting temperature) were distorted but easily recovered. Other plastics with higher melting temperature such as PET showed little distortion. Plastic film material was distorted into loose balls and easily recoverable.

It should be readily apparent, therefore, that applicant has provided a method and apparatus for processing municipal solid waste (including food such as fish, etc., agriculture products, etc.) which offers a significant improvement over the current state-of-art. It should also be apparent that while specific embodiments of my invention are disclosed, various modifications will be apparent to those skilled in the art that is within the spirit and scope of my invention.

I claim:

1. A method for separation of recyclable material from solid waste materials comprising:
    introducing a predetermined quantity of waste materials into a pressure vessel including a pressure chamber;
    heating said waste materials to a predetermined pressure and temperature for a processing period lasting a predetermined period of time by introducing steam into said pressure chamber;
    applying an extruding action to said waste materials during said processing period;
    recovering said mixed waste from said pressurization chamber for classification; and
    separating and recovering the recyclable materials from the classified material.

2. A method as set forth in claim 1 wherein said extruding action is provided by a rotatable screw-like extruding mean carried in said vessel.

3. A method as set forth in claim 2 wherein said solid waste materials are continuously fed into said heated and pressurized chamber for processing thereof.

4. A method as set forth in claim 3 wherein said waste materials are continuously directed out of said vessel responsive to the processing.

5. A method as set forth in claim 4 wherein said processed material is classified responsive to exiting said vessel so that the recyclable wastes may be separated from the non-recyclable wastes.

6. A method as set forth in claim 5 wherein said classification occurs in a rotating trommel disposed in communication with the exit end of said vessel, said trommel having a larger volume than the volume of said vessel.

7. A method as set forth in claim 2 wherein said vessel includes an inlet and an outlet and discrete closure means for said inlet and said outlet.

8. A method as set forth in claim 7 including the steps of introducing said solid wastes into said vessel through said inlet while retaining said outlet in closed relation and pressurizing, heating and rotating said vessel while applying said extruding action to said solid waste material with said outlet closed.

9. A method as set forth in claim 8 including the step of opening said closure member subsequent to said processing period for venting said vessel and to permit recovery of said processed materials.

10. A method as set forth in claim 2 wherein said rotatable screw-like extruding means includes a screw-like member secured to the internal surface of said chamber and extending therein, said screw-like member having a first end adjacent an entrance end of said pressure vessel and a second end adjacent an exit end of said pressure vessel, said second end forming a constriction through which said waste materials are extruded.

11. Apparatus for separation and recovery of recyclable materials from solid waste materials comprising:
    a rotatable pressure vessel having a chamber including inlet and outlet means;

means for introducing said solid waste materials into said inlet means;

means for pressurization and heating said solid waste materials in said chamber;

extruder means carried in said vessel for applying an extruding action to said solid waste materials while said vessel is in a heated and pressurized state, said extruder means being further disposed for expelling the processed solid waste from said vessel responsive to exposing said solid waste materials to heat and pressurization for a predetermined time period.

12. Apparatus as set forth in claim 11 wherein said pressure vessel is provided with first and second ends, said first end having an inwardly tapered inner surface, said vessel having a screw-like member carried therein; said screw-like member having first and second ends, said first end of said screw-like member being disposed in said inwardly tapered inner surface of said first end of said pressure vessel, said screw-like member disposed for rotation to effect an extruding action on said solid waste material through said inwardly tapered surface of said vessel.

13. Apparatus as set forth in claim 12 wherein said screw-like member includes a plurality of blades secured to and inwardly extending from the internal surface of said vessel.

14. Apparatus as set forth in claim 11 wherein said vessel is provided with an entrance portion, a conical exit portion and a cylindrical intermediate portion, said screw-like member extending substantially at least along the length of said intermediate and exit portions and having a tapered end portion carried in said conical exit portion and forming a constriction with said exit portion, whereby said waste material is extruded through the constricted said exit portion.

15. Apparatus as set forth in claim 14 including a source of steam in communication with said chamber for heating and pressurization thereof.

16. Apparatus as set forth in claim 15 including a pair of sparging lines connected to said source of steam and communicating with said chamber for directing steam into said chamber for heating and pressurization thereof.

17. Apparatus as set forth in claim 16 including processed waste material receiving means in communication with said vessel for receiving said processed materials for classification thereof.

18. Apparatus as set forth in claim 17 wherein said processed waste receiving means is a rotating trommel having a volume greater than the volume of said vessel, said rotating trommel being disposed in direct communication with said vessel.

19. Apparatus as set forth in claim 11 wherein said trommel includes means for classifying said processed materials by separating said processed materials according to size, whereby the recyclable materials may be recovered from said classified materials.

20. Apparatus as set forth in 11 wherein said waste materials are municipal solid waste materials which are obtainable from landfill mining.

21. Apparatus as set forth in claim 11 including microprocessor means for controlling the sequence and time of operation of said apparatus for the processing of said waste materials.

* * * * *